US009463807B2

(12) United States Patent
Mansur et al.

(10) Patent No.: US 9,463,807 B2
(45) Date of Patent: Oct. 11, 2016

(54) VEHICLE START CONTROL

(71) Applicant: Ford Global Technologies, LLC, Dearborn, MI (US)

(72) Inventors: William Najib Mansur, West Bloomfield, MI (US); Daniel Paul Roberts, Livonia, MI (US); Mark Douglas Malone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/599,578

(22) Filed: Jan. 19, 2015

(65) Prior Publication Data

US 2016/0207541 A1     Jul. 21, 2016

(51) Int. Cl.

| B60W 10/06 | (2006.01) |
| B60W 50/00 | (2006.01) |
| F02N 11/08 | (2006.01) |
| B60W 10/30 | (2006.01) |
| B60W 50/14 | (2012.01) |
| B60W 10/08 | (2006.01) |

(52) U.S. Cl.
CPC .......... *B60W 50/0098* (2013.01); *B60W 10/06* (2013.01); *B60W 10/08* (2013.01); *B60W 10/30* (2013.01); *B60W 20/13* (2016.01); *B60W 50/14* (2013.01); *F02N 11/0807* (2013.01); *B60W 2050/146* (2013.01); *B60W 2710/0666* (2013.01); *B60W 2710/0677* (2013.01); *B60W 2710/086* (2013.01); *B60W 2710/305* (2013.01); *Y10S 903/93* (2013.01)

(58) Field of Classification Search
CPC ............... B62D 31/003; B60W 10/06; B60H 1/00657; B60H 1/04; F02N 11/0807; F02D 45/00; H02J 7/0019; H02J 7/0025; F01P 11/08; F02F 1/10; B60K 6/48

USPC ........... 701/2, 36, 113, 22; 236/51; 320/101, 320/118; 123/41.08, 142.5 R, 179.4, 41.72
See application file for complete search history.

(56) References Cited

U.S. PATENT DOCUMENTS

| 2004/0111199 | A1* | 6/2004 | Javaherian | ......... F02N 11/0807 701/36 |
| 2004/0211381 | A1* | 10/2004 | Ogawa | ..................... B60H 1/04 123/179.4 |
| 2010/0072290 | A1* | 3/2010 | Dage | .................. B60H 1/00657 236/51 |
| 2010/0320959 | A1* | 12/2010 | Tomberlin | ........... B62D 31/003 320/101 |
| 2012/0043931 | A1* | 2/2012 | Terao | ..................... H02J 7/025 320/108 |
| 2012/0125278 | A1* | 5/2012 | Ries-Mueller | ........ B60W 10/06 123/142.5 R |

(Continued)

OTHER PUBLICATIONS http://www.directed.com/smartstart/, Directed SmartStart, Apple, 2014, pp. 1-3.

(Continued)

*Primary Examiner* — Yuri Kan
(74) *Attorney, Agent, or Firm* — David B. Kelley; Brooks Kushman P.C.

(57) ABSTRACT

A vehicle may include a controller programmed to, while operating an engine responsive to a remote start request and in response to exhaust sensor data indicative of engine closed loop operation, operate the engine and an electric machine to provide power to a low voltage battery and a high voltage battery at respective rates that are based on a target engine torque, and a temperature of the engine or electric machine.

18 Claims, 2 Drawing Sheets

(56) References Cited

U.S. PATENT DOCUMENTS

| | | | |
|---|---|---|---|
| 2013/0099747 A1* | 4/2013 | Baba | H02J 7/0019 320/118 |
| 2013/0144515 A1* | 6/2013 | Okamoto | F02D 45/00 701/113 |
| 2013/0184970 A1 | 7/2013 | Kanafani | |
| 2013/0253748 A1* | 9/2013 | Kiuchi | B60K 6/48 701/22 |
| 2014/0238318 A1* | 8/2014 | Zhang | F02F 1/10 123/41.72 |
| 2014/0261254 A1* | 9/2014 | Gonze | F01P 11/08 123/41.08 |

OTHER PUBLICATIONS

2014/Durango/User Guide, Chrysler Group LLC, 14WD01-926-AA, 2013, 180 pages.

* cited by examiner

VEHICLE START CONTROL

TECHNICAL FIELD

The present disclosure relates to control of vehicle subsystems during start.

BACKGROUND

Vehicles may be provided with a remote start feature whereby a vehicle occupant may start an engine of the vehicle in response to toggling a key fob or other radio frequency based transmitter remote from the vehicle. In response to the engine starting, a climate control system in the vehicle may default to the last known state (the state of the climate control system after most recent engine shut off). In some cases, the engine may be allowed to idle beyond the point at which the last known state of the climate control system is satisfied. The engine, for example, may continue to run until the expiration of a timer.

SUMMARY

A vehicle may include an engine, a transmission, a battery, and a controller. The controller may be programmed to, in response to receiving a remote vehicle start request, start the engine. The controller may be further programmed to, in response to an engine temperature less than a threshold and an absence of an occupant, operate the engine to apply a torque to the transmission. The torque applied to the transmission may be at a value greater than an idle torque value based on the engine temperature and a state of charge of the battery.

A vehicle may include a controller programmed to, while operating an engine responsive to a remote start request and in response to exhaust sensor data indicative of engine closed loop operation, operate the engine and an electric machine. The engine and the electric machine may be operated to provide power to a low voltage battery and a high voltage battery at respective rates that are based on a target engine torque, and a temperature of the engine or electric machine.

A method of controlling a vehicle may include starting an engine responsive to a request from a remote device. The method may further include, in response to exhaust sensor data indicative of engine closed loop operation, operating the engine to apply a torque to a transmission at a value that is based on an ambient temperature and is greater than an idle torque value.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
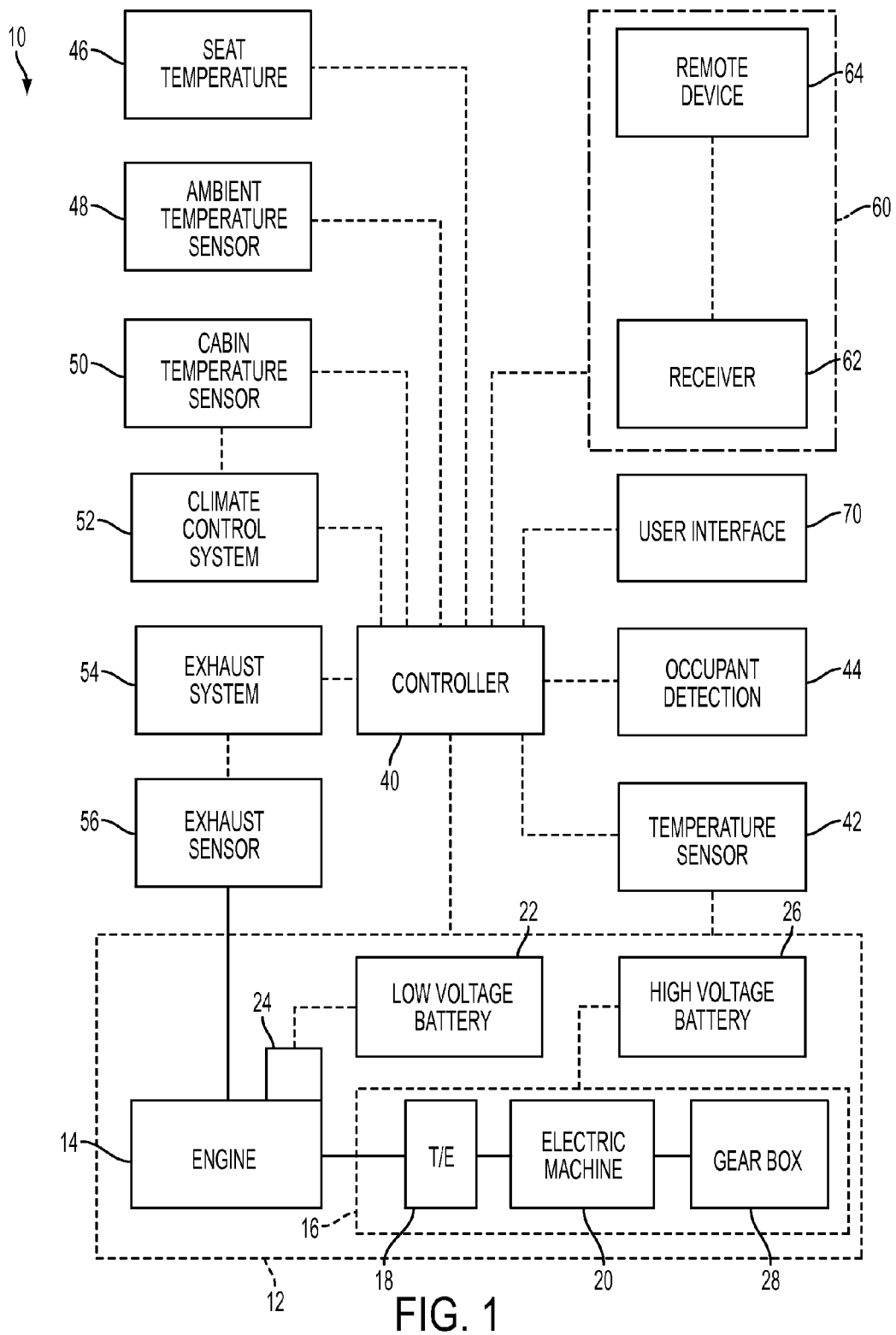
FIG. 1 is a schematic diagram of a vehicle according to an exemplary embodiment of the present disclosure.

Referring to FIG. 1, a schematic diagram of a vehicle 10 is illustrated according to an exemplary embodiment of the present disclosure. Physical placement and orientation of the components within the vehicle 10 may vary. Although the vehicle of FIG. 1 will be particularly described, the strategies in accordance with embodiments of the present disclosure may apply to other vehicle configurations.

The vehicle 10 may include a powertrain 12 having an engine 14 that is selectively coupled to a transmission 16. The transmission 16 may include transmission electronics 18, an electric machine 20 such as an electric motor-generator, and a gear box 22.

The engine 14 may be selectively mechanically coupled to the electric machine 20 and the remainder of the transmission 16. In at least one embodiment, the transmission electronics 18 may vary the amount of torque applied by the engine 14 to the electric machine 20. The engine 14 and the electric machine 20 may both act as drive sources for the vehicle 10 by providing torque to the gearbox 22. The electric machine 20 may be implemented by any one of a plurality of types of electric machines, such as a permanent magnet synchronous motor.

An alternator 24, which may be commonly referred to as a generator, may be drivably coupled to the engine 14. The alternator 24 may be configured to rotate as the engine 14 rotates. The rotation of the alternator 24 may spin a rotor about a stator to produce a magnetic field that may create an electrical current. The current may be rectified by a rectifier disposed within the alternator 24 and may be output to the low voltage battery 26. A voltage regulator may adjust the current, an alternator speed, or an alternator load to satisfy a desired or target alternator output voltage or output current.

A controller 40 may be configured to operate the vehicle 10 or powertrain 12 in a plurality of modes. The controller may operate the vehicle 10 in a charge depletion mode. In the charge depletion mode the engine 14 may be isolated from the remainder of the powertrain 12 and the electric machine 20 may act as the sole drive source for the vehicle 10 using a high voltage battery 28 as its power source.

The controller 40 may operate the vehicle 10 in a charge sustaining mode. In the charge sustaining mode the engine 14 may be operatively connected to the remainder of the powertrain 12 and the engine 14 and electric machine 20 may act as drive sources for the vehicle 10. Power may be provided to the high voltage battery 28 by the electric machine 20 to charge the high voltage battery 28 at a rate.

The controller 40 may be configured to operate the vehicle 10 or powertrain 12 with noise control. Noise control may attempt to reduce noise, vibrations, or harshness (NVH) that may be experienced by occupants of the vehicle 10, including the driver and passengers, by applying noise reduction enhancements to the powertrain 12.

The noise reduction enhancements may impose rotational speed or torque limits on various powertrain components, such as no-fly rpm zones, flare control, etc. In at least one embodiment, the engine 14 may be operated with engine noise limits that may limit or reduce the engine rotational speed, the engine load, or the engine torque to reduce or limit engine noise due to intake air, combustion, etc. In at least one embodiment, the electric machine 20 may be operated with electric machine noise limits that may limit the rotational speed or the torque of the electric machine 20 to reduce or limit electric machine noise due to electric machine whining. The engine noise limits and the electric machine noise limits may negatively impact fuel economy.

The controller 40 may include at least one microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 40 may communicate with various engine/vehicle sensors and actuators via input communication channels and output communication channels that may be implemented as an integrated interface that provides various raw data or signal conditioning, processing, and/or conversion, short-circuit protection, and the like. Alternatively, one or more dedicated hardware or firmware chips may be used to condition and process particular signals before being supplied to the CPU.

Sensors may communicate with the controller 40 through an interface including input communication channels. The sensors may communicate signals that may be used to indicate turbocharger boost pressure, turbocharger rotation speed, crankshaft position, engine rotational speed (RPM), wheel speeds, vehicle speed, engine coolant temperature, ambient temperature, battery temperature, engine compartment temperature, engine oil temperature, intake manifold pressure, accelerator pedal position, ignition switch position, throttle valve position, intake air temperature, exhaust gas oxygen or other exhaust gas component concentration or presence, intake air flow, transmission gear, ratio, or mode, transmission oil temperature, transmission turbine speed, torque converter bypass clutch status, deceleration, or shift mode, for example.

Although not explicitly illustrated, those of ordinary skill in the art will recognize various functions or components that may be controlled by the controller 40 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as the alternator, air conditioning compressor, battery charging, regenerative braking, transmission clutch pressures, and the like.

The controller 40 may be in communication with the powertrain 12 and a plurality of vehicle sensors and subsystems. The sensors may include a temperature sensor 42, an occupant detection sensor 44, a seat temperature sensor 46, an ambient temperature sensor 48, and a cabin temperature sensor 50. The subsystems may include a climate control system 52, an exhaust system 54, a communication system 60, and a user interface 70.

The temperature sensor 42 may monitor various powertrain component temperatures. The temperature sensor 42 may provide a signal indicative of an engine oil temperature, an engine coolant temperature, a transmission oil temperature, or an electric machine temperature.

The occupant detection sensor 44 may provide a signal indicative of occupant presence to the controller 40. The occupant detection sensor 44 may be part of a passive entry system that may determine whether a potential occupant is within a predetermined range of the vehicle 10.

The occupant detection sensor 44 may be a door sensor, configured to monitor the status of a vehicle door. The status of the vehicle door may indicate if a vehicle door is open, closed, locked, or unlocked. The door sensor may be a door jamb switch, a sensor configured to receive a door unlock/lock signal from a key fob, a sensor configured to provide the unlocked/locked state of a vehicle door lock, or the like.

The occupant detection sensor 44 may be configured to monitor whether an occupant is present within the vehicle 10. The occupant detection sensor 44 may be a remote device receiver/locator in communication with a remote device, a seat belt switch, a seat sensor, a motion sensor, or a sensor configured to monitor whether the parking brake is activated.

The seat temperature sensor 46 may monitor the surface temperature of a vehicle seat. The vehicle seat may be provided with at least one heating element and/or at least one cooling element as part of a vehicle seat heating/cooling system.

The cabin temperature sensor 50 may be configured to monitor the temperature of the vehicle cabin or vehicle interior. The cabin temperature sensor 50 may be part of the climate control system 52. The climate control system 52 may be a dual or multi-zone climate control system that may enable the operator or passengers of the vehicle 10 to set or adjust cabin temperatures in different zones of the vehicle interior.

The exhaust system 54 may be in communication with an exhaust sensor 56. The exhaust sensor 56 may be an exhaust temperature sensor or an oxygen sensor.

The communication system 60 may include a receiver 62 configured to receive a data transmission from a remote device 64. The remote device 64 may be a key fob, a radio frequency based transmitter, a nomadic device such as a cellular phone equipped with a Bluetooth transmitter, near field communication system, etc.

The remote device 64 may be configured to provide a remote vehicle start request, while an occupant of the vehicle 10 is absent the vehicle 10. The remote vehicle start request may include an engine start request and a climate control system setting request.

The controller 40 may command an engine start in response to receiving the engine start request of the remote vehicle start request. The controller 40 may enable the climate control system 52 in response to the engine starting. The climate control system 52 may be operated to satisfy the climate control system setting request.

The climate control system setting request may be an operator desired climate control system parameter. The desired climate control system parameter may be a cabin temperature, a seat temperature, and in at least one embodiment, a powertrain temperature. The climate control system setting request may differ from a climate control setting from a previous driving cycle. The climate control setting request may differ from a climate control setting when an occupant is present within the vehicle 10.

The remote device 64 may be configured to provide a remote vehicle shutdown request, while an occupant of the vehicle 10 is absent the vehicle 10. In response to receiving the remote vehicle shutdown request, the controller 40 may command an engine shutdown and deactivate the climate control system 52.

The remote device 64 may provide a remote vehicle start request to the controller 40. The controller 40 may command an engine start and operate the engine 14 and/or electric machine 20. The controller 40 may monitor for the presence of an occupant within the vehicle 10, via the occupant detection sensor 44.

The controller 40 may operate the powertrain 12 in an ECO Remote Start Mode responsive to the controller 40 receiving a remote vehicle start request from the remote device and the occupant detection sensor 44 providing a signal indicative of the absence of an occupant. In the ECO Remote Start Mode, the controller 40 may command a disablement of the noise reduction enhancements.

The controller 40 may output for display via the user interface 70 a warning indicative of disablement of noise control. The warning may indicate that the engine noise limits and electric machine noise limits have been disabled. The warning may be displayed via the user interface 70 of the vehicle 10 and/or the remote device 64.

The engine 14 and transmission 16 may be operated such that power is provided to the high voltage battery 28 and the low voltage battery 26 at a rate. The rate of charging may be based on an engine output torque, an ambient temperature, an engine temperature, an electric machine temperature, a high voltage battery temperature, a low voltage temperature, a state of charge of the high voltage battery, or a state of charge of the low voltage battery. The rate of charging may also increase the high voltage battery temperature.

The controller 40 may operate the engine 14 with increased engine torque availability in response to an ambient temperature less than a threshold ambient temperature. In at least one embodiment, the controller 40 may operate the engine 14 with increased torque availability in response to an engine temperature less than a threshold engine temperature. The increased engine torque availability may increase a load applied to the engine 14 that may result in an increase in the engine temperature at a rate greater than a rate of engine temperature increase without increasing the load applied to the engine 14.

The engine 14 may be operated with increased engine torque availability such that the engine 14 and the electric machine 20 are operated to provide power to the high voltage battery 28 in response to an engine temperature less than an engine temperature threshold and a high voltage battery temperature less than a high voltage battery temperature threshold. Power may be provided at a rate based on at least one of an engine temperature, a high voltage battery temperature, a target engine torque, an engine speed, and an engine brake specific fuel consumption. The power may be provided at the rate at least until the engine temperature is greater than the engine temperature threshold. The power may be provided at the rate such that the high voltage battery temperature increases and may be provided to the high voltage battery at least until the high voltage battery temperature is greater than the high voltage battery temperature threshold.

The engine torque availability may be increased by a variety of methods. The controller 40 may command an increase in the engine rotational speed greater than a default idle rotational speed. The controller 40 may increase the load applied to the engine 14 by increasing an amount of engine air intake, increasing an amount of fuel provided to the engine 14, or advancing an engine cam such that engine output torque may be increased. The controller 40 may also increase a load applied to the engine 14 by the electric machine 20 or the transmission 16.

The engine 14 may apply torque to the electric machine 20 and/or the alternator 24 by the engine 14 at a value greater than an engine idle torque value. The torque applied to the electric machine 20 and/or the alternator 24 may be based on an engine temperature, an ambient temperature, a high voltage battery temperature, a high voltage battery state of charge, or an engine fuel map. The engine fuel map may be a look-up table provided within the controller 40 that may enable the controller to determine an optimal engine operating point, or an engine speed and engine torque value that may provide the best fuel consumption rate or brake specific fuel consumption rate. The engine speed may be an engine speed greater than a default idle engine speed.

The amount of torque applied to the electric machine 20 and/or the alternator 24 may be adjusted in response to the state of charge of the high voltage battery 28 or the state of charge of the low voltage battery 26. The amount of torque applied to the electric machine 20 and/or the alternator may be cycled (raised and lowered) to assist in warming the high voltage battery 28 and/or the low voltage battery 26 in ambient temperatures less than a threshold ambient temperature (cold start conditions).

The controller 40 may operate the powertrain 12 in ECO Remote Start Mode in response to the engine 14 operating in "closed loop" operation. The controller 40 may determine that the engine 14 is operating in "closed loop" operation in response to exhaust sensor data indicative of engine closed loop operation. The data indicative of engine closed loop operation may be a signal indicative of the temperature of the oxygen sensor of the exhaust sensor 56 being greater than a threshold oxygen sensor temperature. The data indicative of closed loop operation of the engine 14 may be a signal provided by the oxygen sensor of the exhaust sensor 56 indicative of the fuel-air mixture within the exhaust gases.

The oxygen sensor of the exhaust sensor 56 may be configured to monitor an amount of oxygen present within the exhaust gases directed through the exhaust system 54 to the external environment surrounding the vehicle 10. The controller 40 may regulate a fuel-air mixture provided to the engine 14 using signals received from the oxygen sensor. The adjustment of the fuel-air mixture provided to the engine 14 in response to signals provided by the oxygen sensor of the exhaust system 54 may be referred to as "closed loop." The exhaust temperature being greater than the threshold exhaust temperature may indicate the commencement of "closed loop" operation.

The controller 40 may determine that there is a fuel rich mixture provided to the engine 14 based on receiving a signal from the oxygen sensor indicative of an amount of oxygen in the exhaust gases less than a threshold. In response to the signal, the controller 40 may command an increase in the amount of air provided to the engine 14 or a decrease in the amount of fuel provided to the engine 14.

The controller 40 may determine that there is a fuel lean mixture provided to the engine 14 based on receiving a signal from the oxygen sensor indicative of an amount of oxygen in the exhaust gases greater than a threshold. In response to the signal, the controller 40 may command a decrease in the amount of air provided to the engine 14 or an increase in the amount of fuel provided to the engine 14.

The controller 40 may determine that there is a balanced fuel-air mixture provided to the engine 14 based on receiving a signal from the oxygen sensor indicative of an amount of oxygen in the exhaust gases within a predetermined range.

The controller 40 may command that a fuel rich fuel-air mixture be provided to the engine 14 in response to an ambient temperature less than a threshold ambient temperature. This may be referred to as "open loop" operation. In "open loop" operation the controller 40 regulates the fuel-air mixture provided to the engine prior to or irrespective of receiving a signal from the oxygen sensor of the exhaust sensor 56 indicative of the amount of oxygen present in the exhaust gases.

The controller 40 may operate the climate control system 52 to satisfy the climate control setting request in response to "closed loop" operation of the engine 14 beginning. In at least one embodiment, the controller 40 may operate the climate control system 52 to satisfy the climate control setting request in response to a signal indicative of the presence of an occupant within the vehicle and/or the engine temperature being greater than the threshold engine temperature.

The controller 40 may command an engine shutdown prior to the entry of an occupant into the vehicle 10 in response to the climate control system 52 satisfying the climate control system setting request. The controller 40 may command an engine shutdown in response to a vehicle temperature measured by the temperature sensor 42 being greater than a threshold powertrain temperature.

Figure 2:
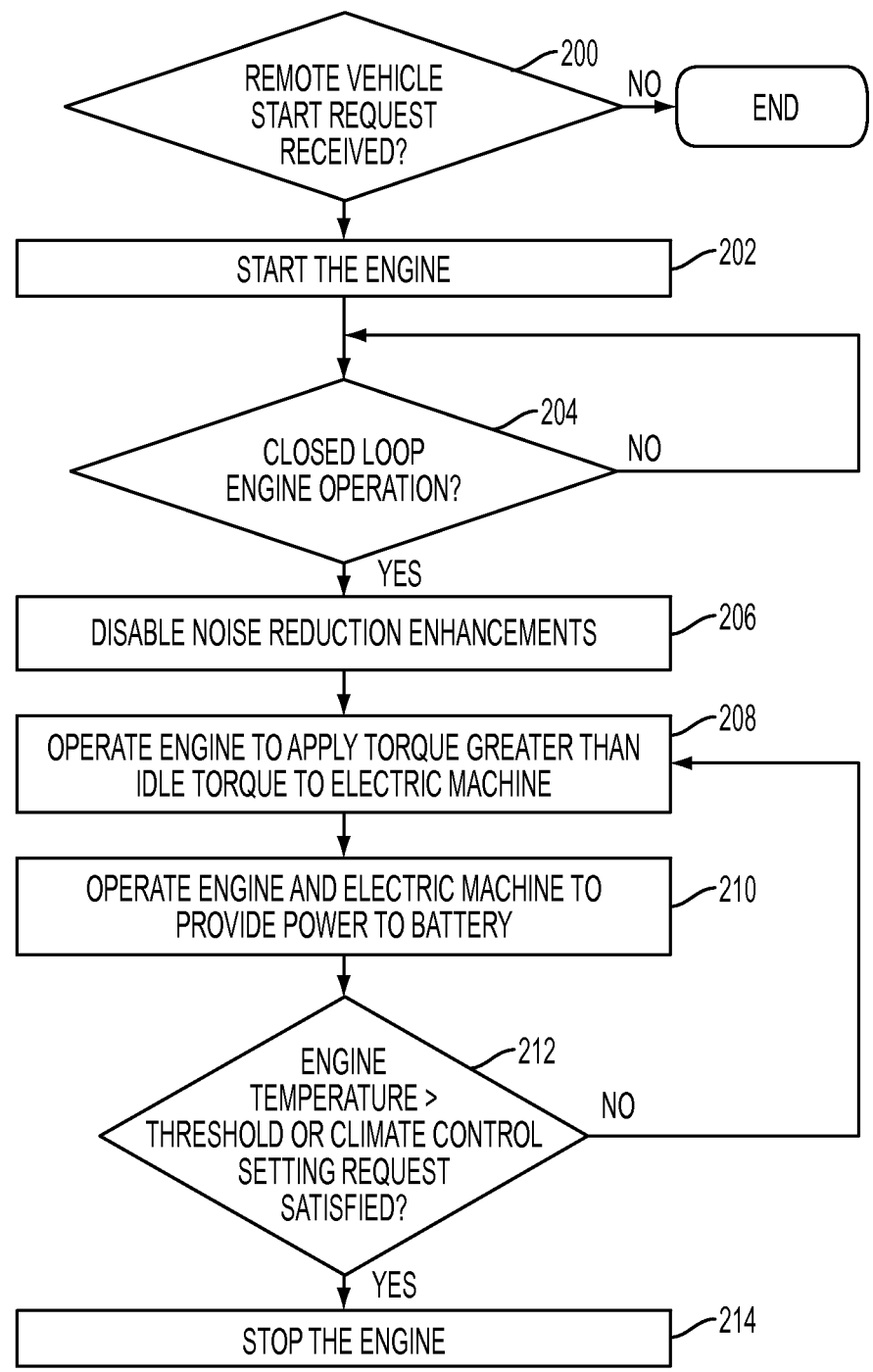
FIG. 2 is a flowchart of a method of controlling a vehicle according to an exemplary embodiment of the present disclosure.

Referring to FIG. 2, a flowchart of an exemplary method of controlling the vehicle 10 is shown. The method may be executed by the controller 40 and may be implemented as a closed loop control system. For brevity, the method will be described in the context of a single iteration below.

The control logic may monitor the ignition state and occupant presence within the vehicle. At block 200, the method may determine whether a remote vehicle start request from the remote device 64 has been received. The remote vehicle start request may include an engine start request and a climate control system setting request. If the remote vehicle start request has not been received, the method may end. As a result of the method ending, the engine 14 may be started normally or a standard remote start may occur. Should the controller 40 have received the remote vehicle start request from the remote device 64, the method may start the engine 14 at block 202.

In at least one embodiment, the method may determine if an occupant is present within the vehicle 10. If an occupant is within the vehicle 10, the method may end and perform a standard remote start with the noise reduction enhancements enabled, unless an occupant overrides the ECO Remote Start Mode and enable the noise reduction enhancements. In at least one embodiment, an occupant may activate the ECO Remote Start Mode. The method may continue to block 204 while operating the vehicle 10 or powertrain 12 in ECO Remote Start Mode.

At block 204, the method may determine whether the engine 14 has achieved "closed loop" operation. The method may receive exhaust sensor data indicative of engine closed loop operation. If the oxygen sensor of the exhaust sensor 56 is not providing a signal indicative of the amount of oxygen present within the exhaust gases, the engine 14 may not have achieved "closed loop" operation and the method may continue to monitor if the engine 14 has achieved "closed loop" operation. Should the oxygen sensor of the exhaust sensor 56 provide a signal indicative of the amount of oxygen present within the exhaust gases, the engine 14 may have achieved "closed loop" operation and the method may continue to block 206.

At block 206, the method may operate the engine 14 and the electric machine 20 of the transmission 16 with the noise reduction enhancements disabled. The engine 14 and the electric machine 20 of the transmission 16 may be operated irrespective of noise and vibration speed control limits. In at least one embodiment, the climate control system 52 may be operated to satisfy a climate control system setting request.

At block 208, the method may operate the engine 14 to apply a torque to the electric machine 20. The torque applied may be at a value greater than an engine idle torque. The torque applied may be based on an ambient temperature, an engine temperature, a transmission temperature, an electric machine temperature, a state of charge of high voltage battery, a state of charge of the low voltage battery, and/or an engine speed. The torque may be applied at least until an engine temperature is greater than a threshold engine temperature or at least until the climate control system setting request is satisfied.

At block 210, the method may operate the engine 14 and the electric machine 20 to provide power to the high voltage battery 28. The power may be provided to the high voltage battery 28 at a first rate based on a high voltage battery temperature, a state of charge of the high voltage battery 28, and/or an engine torque/speed. In at least one embodiment, the method may operate the alternator 24 to provide power to the low voltage battery 26. The power may be provided to the low voltage battery 26 at a second rate based on a low voltage battery temperature, a state of charge of the low voltage battery 26, and/or an engine torque/speed. The first and second respective rates may be different from each other, such that the first rate is greater than the second rate.

At block 212, the method may determine whether an engine temperature is greater than a threshold engine temperature or whether the climate control system has satisfied the climate control setting request while an occupant is absent the vehicle 10. If the engine temperature is less than the threshold engine temperature or the climate control system has not satisfied the climate control setting request, the method may return to block 208. Should the engine temperature be equal to or greater than the threshold engine temperature, or if the climate control system has satisfied the climate control setting request, the method may continue to block 214. At block 214, the method may stop the engine 14 or shutdown the engine 14.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   an engine, transmission, and battery; and
   a controller programmed to
      in response to receiving a wireless remote vehicle start request including a climate control setting request, start the engine, and
      in response to absence of an occupant, operate the engine at a torque exceeding an idle torque value and stop the engine in response to satisfying the climate control system setting request.

2. The vehicle of claim 1 wherein the controller is further programmed to operate the engine and transmission such that the battery is charged at a rate that increases battery temperature.

3. The vehicle of claim 1 wherein the controller is further programmed to, in response to engine temperature being exceeding an associated threshold, operate the climate control system to satisfy the climate control setting request.

4. The vehicle of claim 3 wherein the controller is further programmed to, in response to engine temperature being greater than a threshold, stop the engine.

5. The vehicle of claim 1 wherein the controller is further programmed to suspend engine speed and torque limits associated with noise control; and
output for display a warning indicative of disablement of noise control.

6. A vehicle comprising:
a controller programmed to, while operating an engine and an electric machine responsive to a wireless remote start request, suspend noise control for the engine and electric machine in response to a signal indicating absence of an occupant until receiving exhaust sensor data indicative of engine closed loop operation.

7. The vehicle of claim 6 wherein the controller is further programmed to operate the engine and the electric machine to provide power to a high voltage battery until temperature of the high voltage battery exceeds a battery temperature threshold.

8. The vehicle of claim 7 wherein a rate to provide power to the high voltage battery is based on an ambient temperature, a state of charge of the high voltage battery, or a state of charge of a low voltage battery.

9. The vehicle of claim 6 further comprising a climate control system, wherein the controller is further programmed to, in response to a signal indicating a presence of an occupant and the temperature of the engine being greater than a threshold, operate the climate control system to satisfy a climate control system setting request.

10. The vehicle of claim 9 wherein the controller is further programmed to, in response to the climate control system satisfying the climate control system setting request, shutdown the engine.

11. A method of controlling a vehicle comprising:
starting an engine, by at least one controller, responsive to a request from a remote device; and
in response to exhaust sensor data indicative of engine closed loop operation, operating the engine, by at least one controller, to apply a torque to a transmission at a value that is based on an ambient temperature and is greater than an idle torque value.

12. The method of claim 11, wherein the value is further based on engine speed and engine brake specific fuel consumption.

13. The method of claim 11, wherein the request includes a climate control system setting request, further comprising in response to an engine temperature greater than a threshold, operating a climate control system by the at least one controller to satisfy the climate control system setting request.

14. The method of claim 13 further comprising, in response to satisfying the climate control system setting request the at least one controller stopping the engine.

15. The method of claim 11 further comprising operating the engine and transmission by the at least one controller to provide power to a high voltage battery at a rate that is based on a temperature of the high voltage battery and the value.

16. The method of claim 15 further comprising operating an alternator by the at least one controller to provide power to a low voltage battery at a rate that is based on the value.

17. The method of claim 11 further comprising, in response to a signal indicative of an absence of an occupant, operating the engine and transmission by the at least one controller irrespective of noise and vibration speed control limits.

18. The vehicle of claim 1 further comprising a traction motor coupled to the engine and the transmission.

* * * * *